(12) United States Patent
Rawer et al.

(10) Patent No.: US 9,091,572 B2
(45) Date of Patent: Jul. 28, 2015

(54) DISPLAY DEVICE

(76) Inventors: Marc Rawer, Stuttgart (DE); Mike Duss, Marxzell (DE)

( * ) Notice: Subject to any disclaimer, the term of this patent is extended or adjusted under 35 U.S.C. 154(b) by 150 days.

(21) Appl. No.: 13/575,015

(22) PCT Filed: Jan. 26, 2011

(86) PCT No.: PCT/EP2011/000326
§ 371 (c)(1),
(2), (4) Date: Nov. 6, 2012

(87) PCT Pub. No.: WO2011/107189
PCT Pub. Date: Sep. 9, 2011

(65) Prior Publication Data
US 2013/0048856 A1 Feb. 28, 2013

(30) Foreign Application Priority Data
Feb. 3, 2010 (DE) .......................... 10 2010 006 658

(51) Int. Cl.
*G02F 1/1333* (2006.01)
*G01D 11/30* (2006.01)
*B60K 35/00* (2006.01)

(52) U.S. Cl.
CPC ............... *G01D 11/30* (2013.01); *B60K 35/00* (2013.01); *B60K 2350/307* (2013.01)

(58) Field of Classification Search
CPC .......... B32B 2037/246; B22F 2998/00; B60K 35/00
USPC .................................................... 349/58, 59
See application file for complete search history.

(56) References Cited

U.S. PATENT DOCUMENTS

| | | | | |
|---|---|---|---|---|
| 5,572,344 A | * | 11/1996 | Jackson et al. | 349/41 |
| 7,457,109 B2 | * | 11/2008 | Goto et al. | 361/679.55 |
| 7,977,170 B2 | * | 7/2011 | Tredwell et al. | 438/151 |
| 8,287,285 B2 | | 10/2012 | Mainville et al. | |
| 2002/0092160 A1 | * | 7/2002 | McCullough | 29/830 |
| 2002/0127767 A1 | * | 9/2002 | Wang | 438/106 |
| 2004/0075982 A1 | * | 4/2004 | Kim et al. | 361/687 |
| 2006/0012969 A1 | * | 1/2006 | Bachman | 361/816 |
| 2007/0285866 A1 | * | 12/2007 | Ueda et al. | 361/120 |
| 2009/0136723 A1 | * | 5/2009 | Zhao et al. | 428/195.1 |
| 2010/0273530 A1 | * | 10/2010 | Jarvis et al. | 455/566 |

FOREIGN PATENT DOCUMENTS

| | | | | | |
|---|---|---|---|---|---|
| DE | | 3622458 | * | 1/1987 | ............ B60K 35/00 |
| DE | | 3622458 A1 | | 1/1987 | |
| DE | | 10047083 | * | 4/2002 | ............ B32B 15/08 |
| DE | | 10047083 A1 | | 4/2002 | |
| JP | | H10243481 A | | 9/1998 | |

(Continued)

OTHER PUBLICATIONS

International Preliminary Report on Patentability mailed Aug. 7, 2012.

(Continued)

*Primary Examiner* — Sang V Nguyen
(74) *Attorney, Agent, or Firm* — Fletcher Yoder, P.C.

(57) ABSTRACT

A display device a display and a front panel. The front panel is made of plastic and is at least partly provided with a metallic coating. The coating is applied by means of physical vapor deposition. The metallic coating is electrically grounded when the display device is placed in operation.

6 Claims, 2 Drawing Sheets

(56) References Cited

FOREIGN PATENT DOCUMENTS

| | | |
|---|---|---|
| JP | 2002027051 A | 1/2002 |
| JP | 2002287644 A | 10/2002 |
| JP | 2005260429 A | 9/2005 |
| JP | 2005275076 A | 10/2005 |
| JP | 2006253737 A | 9/2006 |
| JP | 2008067236 A | 3/2008 |
| JP | 2008103835 A | 5/2008 |
| JP | 2009141778 A | 6/2009 |
| WO | 0125045 A1 | 4/2001 |

OTHER PUBLICATIONS

International Search Report for application No. PCT/EP2011/000326 mailed Oct. 31, 2011.

Japanese Office Action mailed Feb. 10, 2015.

* cited by examiner

DISPLAY DEVICE

BACKGROUND

The present invention relates to a display device comprising a display and front panel.

Display devices with a display are known from the prior art, for example US 2009/0136723. Display devices according to the prior art, which are used in automobile construction, generally comprise an inner panel made of metal. These panels fulfill, in addition to mechanical properties, in particular the function of ESD (Electro Static Discharge) protection. A display device of this type is then generally provided with an optical aperture. The display is thus of very broad and thick construction and is generally very expensive to manufacture. Furthermore, it is susceptible to fouling.

It is therefore the object of the invention to provide a display device that does not exhibit the disadvantages of the prior art.

The object is achieved with a display device with a display and a front panel, wherein the front panel is made of plastic and is at least partly provided with a metallic coating, which is applied by physical vapor separation, wherein the metallic coating is earthed.

SUMMARY

The present invention relates to a display device, in particular a display device that is used in automobile construction. The display device according to the invention can be used in an interior part of a vehicle, e.g. in the instrument panel. It can also be provided in free-standing form, however, e.g. on the instrument panel or the central console. According to the invention, the display device comprises a display. The display is preferably a TFT (Thin Film Transistor) visual display unit or an OLED visual display unit. This visual display unit is comprised in its edge region of a front panel.

According to the invention, this front panel is provided in plastic and is metal coated, at least in some portions, by physical vapor deposition, and the metallic coating is electrically connected to the body of the vehicle and thus grounded, whereby the grounding is effected by connecting the metallic coating to the display and the display in turn to the vehicle's ground. The front panel thus fulfills two functions. On the one hand it dissipates the electric charge of the display and on the other hand it is a design element and a protective element, which makes the display device visually attractive and prevents contamination or moistening of the display. The display device according to the invention has the advantage that the inner metal panel that is provided in the prior art can be dispensed with. The display device according to the invention is thus of lighter construction and can be made thinner overall. Furthermore, the front panel can be arranged closer to the display, reducing the gap between the front panel and the display, which has visual advantages on the one hand and at least reduces fouling and/or moisture ingress and/or deposition between the display and the front panel on the other. Because the metallic coating is applied by vapor deposition, this metallic coating can be made very thin, enabling the elasticity of the plastic of the front panel and/or possibly its transparency to be at least substantially maintained.

The metallic coating is applied to at least parts of the front panel. Preferably, it is applied to the rear, i.e. to the side of the front panel facing away from the observer of the display device.

In a preferred embodiment, the front panel is at least partly provided with a black coating. Areas that are not provided with a metallic coating are preferably provided with the black coating. In particular, the side of the front panel facing the observer is coated black, at least in some areas.

According to a further or a preferred embodiment of the present invention, a light sensor is provided beneath the front side, i.e. on the side of the front panel facing the observer. This preferred embodiment of the present invention has the advantage that an observer, e.g. a vehicle passenger, cannot see the light sensor, so that the display device according to the invention is visually particularly agreeable. Moreover, the front panel protects the sensor against mechanical and/or environmental influences. Because the metallic coating is applied using physical vapor deposition, it is very thin, so that the light sensor itself detects the light conditions in the interior of the motor vehicle through the coated front panel and this signal is used to control the background illumination of the display device, for example.

The light sensor is preferably provided in a blind hole.

Furthermore, the light sensor is preferably an infrared sensor.

The display according to the invention can be any display known to the expert. However, it is preferably a so-called TFT visual display unit (Thin Film Transistor visual display unit).

Furthermore, the display device preferably comprises a housing at the rear. This preferred embodiment of the present invention is then particularly advantageous if the display device according to the invention is arranged in a free-standing manner, e.g. in the interior of the motor vehicle.

DRAWINGS

The invention is explained in detail below using FIGS. 1 to 5. These explanations are, however, only exemplary and do not limit the general concept of the invention. The explanations apply equally to both objects of the present invention.

DETAILED DESCRIPTION

Figure 1:
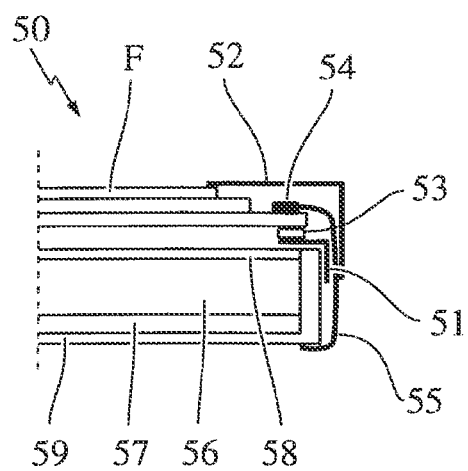
FIG. 1 shows a TFT module according to the invention.

FIG. 1 shows a section through a known TFT (Thin Film Transistor) Module 50. This module 50 comprises an inner panel 51, which prevents electrical charging, in particular of the electronics of the TFT module, and performs screening of the electronics. A front panel 52 protects the known TFT module 50 against mechanical and/or environmental influences. The front panel 52 and the inner panel 51 of the TFT module according to the prior art each consist, for example, of stainless steel or aluminum stamped parts. The known TFT module 50 further comprises a front polarizer F, electronic control chips 54, which are disposed on or attached to the known TFT module 50 according to COG (Chip-on-Glass) technology. A FPC (Flexible Printed Circuit) conducting track 55 to the control chips 54, an optical fiber 56, a reflector film 57 and a film stack 58, e.g. BEF or DBEF, are also components of the known TFT module. The housing 59 is manufactured from aluminum, for example.

Figure 2:
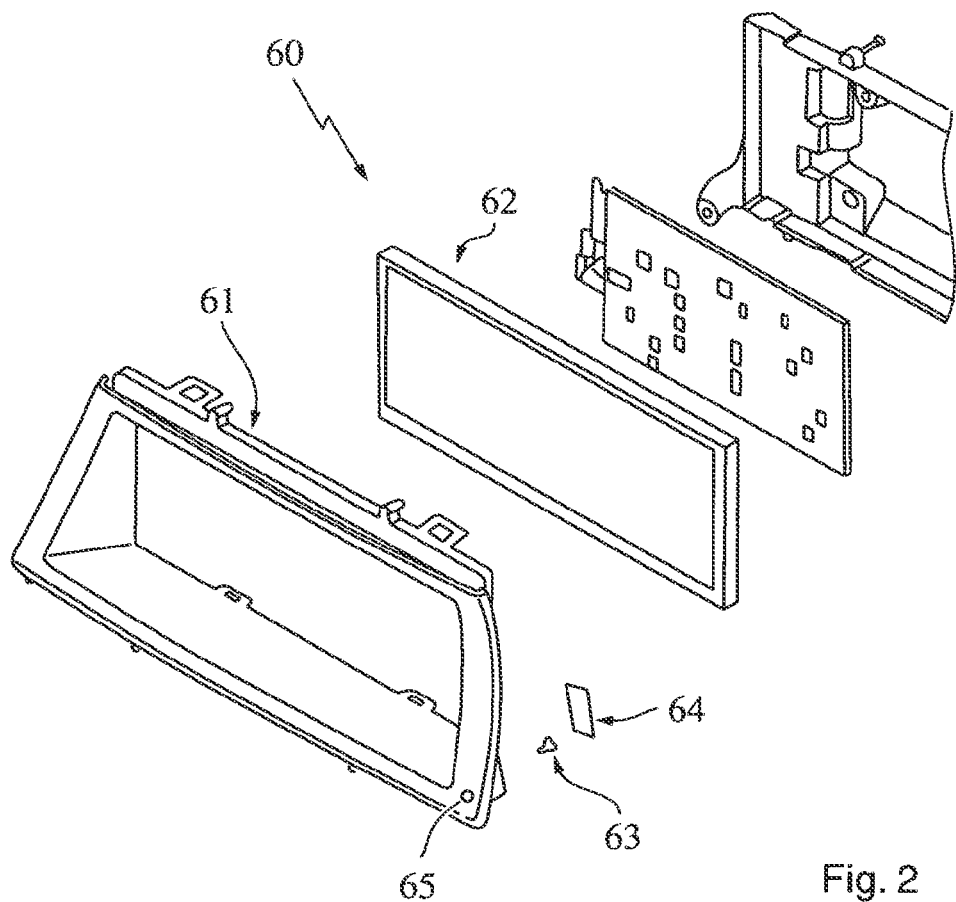
FIG. 2 shows a display device according to the invention.

FIG. 2 shows a conventional display device, such as is known from automobile construction, for example, in an exploded illustration. The known display device comprises the front panel 61 according to the prior art, as well as a known TFT module 62 and an optical fiber 63. An ambient light sensor in the form of a circuit board photo sensor 64 provides output data, which is evaluated to control a background lighting device of the known display device 60 depending on the intensity, e.g. in the motor vehicle. For this purpose an opening 65 for the ambient light sensor is provided in the front panel 61 according to the prior art, which disturbs the overall aesthetic impression, in which moreover dirt often collects, adversely affecting the operation of the light sensor.

Figure 3:
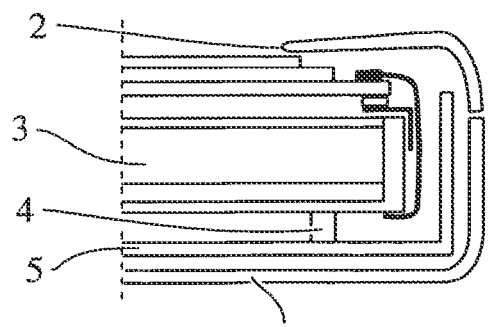
FIG. 3 shows a section through a display device according to the invention.

FIG. 3 shows a section through a display device designed according to the invention, which comprises a TFT Module 3, for example. The front panel 2 designed according to the invention comprises a supporting body, which is made at least partly, and preferably entirely, of plastic. This support is at least partly provided with an electrically conducting layer. This electrically conducting layer is electrically connected, for example, to the body of the vehicle, so that the electrically conducting layer fulfills the function of an ESD (Electrostatic Discharge) protection device, in particular for the integrated circuit. The electrically conducting layer is, according to the invention, deposited on the supporting body of the front panel 2 by means of physical vapor deposition. The combination of mechanical properties of the plastic on the one hand and electrical properties during coating on the other hand for the front panel 2 according to the invention can be of great advantage for a number of applications. To be mentioned in this context is the fact that, for example, the elasticity of the plastic is maintained, so that the manufacture of e.g. clip connections, which depends on the elasticity of the plastic, is enabled. Moreover, the front panel fulfills the function of dissipating electric charge and an electromagnetic screening function, which is gaining in importance owing to the increasing sensitivity of modern electronic components.

Because the inner panel 51 (cf. FIG. 1) can be dispensed with for the display device according to the invention, the front panel 2 can be arranged closer to the surface F of the display, which has visual advantages for one thing, but also other functional advantages, since fouling of the device or the penetration of moisture between the front panel 2 and the display can at least be reduced. Moreover, the device according to the invention is easier to manufacture and has a lower weight than the device according to the prior art.

In order to achieve a black panel effect, the supporting body according to the invention for the front panel 2 can have a black coating. For example, the layer applied by physical vapor deposition can be colored black for this purpose or the black layer can be applied separately to parts of the front panel that have preferably not been provided with a metallic coating.

The front panel according to the invention is connected to an electrical ground. The display device 1 provided according to the invention preferably also comprises a support, in particular a metal support, and a connecting means 4, with which the display is arranged on the support 5.

The disadvantages of the disturbing opening 65 discussed during the description according to FIG. 2 for devices according to the prior art can be avoided for the display device according to the invention because a very thin metallization layer is deposited on the front panel designed according to the invention by means of physical vapor deposition. This provides the option of using an infrared sensor that measures ambient light through the metallization layer. The infrared sensor itself can be arranged behind the front panel according to the invention so as not to be visible to an observer and is thus especially protected against environmental influences, such as fouling or humidity.

Figure 5:
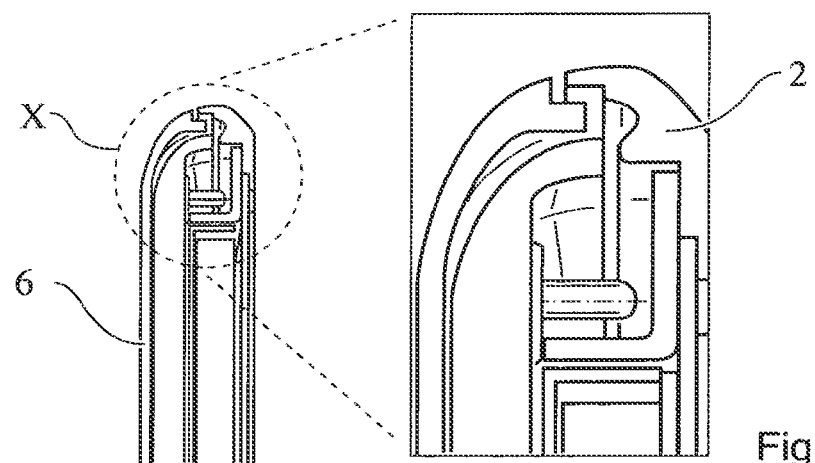
FIG. 5 shows an enlarged detail X from FIG. 4.
Figure 4:
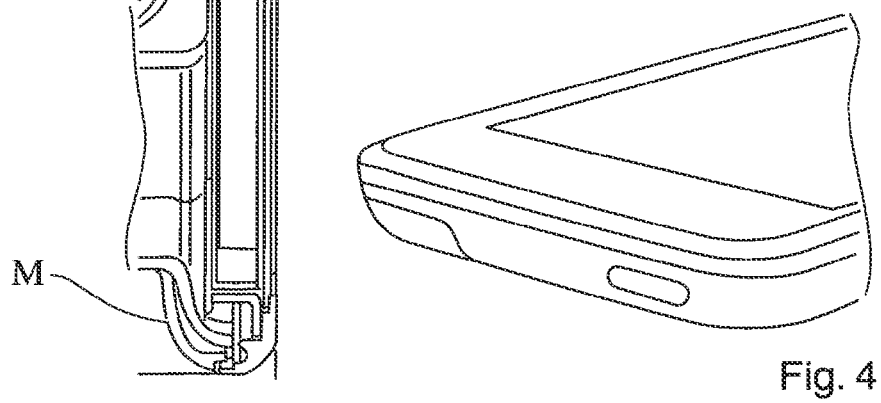
FIG. 4 shows a section through a further display device according to the invention.

FIGS. 4 and 5 show a section through a device designed according to the invention. The device according to the invention comprises inter alia a 3D front panel 2, which according to the invention comprises a metallization layer applied by means of physical vapor deposition. Therefore the inner panel (cf. FIG. 1), which is made of metal, can be omitted. Therefore the display device is of flatter and lighter construction. The front panel 2 is mechanically connected to the housing 6, in particular by a snap mechanism. There is also the option of using an infrared sensor, which is not visible to the user, with this device.

LIST OF REFERENCE SYMBOLS

1 display device designed according to the invention
2 front panel according to the invention
3 display, TFT module
4 connecting means, threaded dome
5 support, metal support
6 housing
51 inner panel
52 front panel
53 adhesive strip
54 electronic control chip
55 FPC conducting track
56 optical fiber
57 reflecting film
58 film stack
59 rear housing
60 known display device
61 conventional front panel
62 known TFT module
63 optical fiber
64 circuit board photo sensor
65 opening
F front polarizer
M display device
X detail

The invention claimed is:

1. A display device comprising:
a display and a front panel, wherein the front panel is arranged proximate the display and overlaps a portion of a viewing surface of the display;
wherein the front panel is made of plastic and is at least partly provided with a metallic coating applied by physical vapor deposition, the metallic coating is applied to the rear of the front panel, facing away from the viewer side of the display device, the metallic coating is electrically grounded to dissipate electric charge and to screen electromagnetic interference while the display device is in operation, a light sensor is disposed behind the metallic coating relative to a vehicle interior, and the light sensor is configured to measure an intensity of ambient light passing through the metallic coating to facilitate control of a background lighting device of the display device.

2. The display device as claimed in claim 1, wherein the front panel comprises a black coating, at least in some regions.

3. The display device as claimed in claim 1, wherein the light sensor is provided in a blind hole of the front panel.

4. The display device as claimed in claim 1, wherein the light sensor comprises an infrared sensor.

5. The display device as claimed in claim 1, wherein the display comprises a TFT visual display unit.

6. The display device as claimed in claim 1, comprising a rear housing.

* * * * *